(12) United States Patent  (10) Patent No.: US 8,312,156 B2
Hirose et al.  (45) Date of Patent: Nov. 13, 2012

(54) COMMUNICATION METHOD CONTROL SYSTEM

(75) Inventors: Yoshitsugu Hirose, Kanagawa (JP);
Masao Watanabe, Kanagawa (JP);
Takayuki Takeuchi, Kanagawa (JP);
Eriko Tamaru, Kanagawa (JP);
Kimitake Hasuike, Kanagawa (JP);
Yoshiro Yamaguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1125 days.

(21) Appl. No.: 12/182,856

(22) Filed: Jul. 30, 2008

(65) Prior Publication Data

US 2009/0153498 A1 Jun. 18, 2009

(30) Foreign Application Priority Data

Dec. 14, 2007 (JP) ................................. 2007-323167

(51) Int. Cl.
*G06F 15/16* (2006.01)
(52) U.S. Cl. ....................................... 709/229; 345/173
(58) Field of Classification Search .................. 709/200, 709/229; 345/173
See application file for complete search history.

(56) References Cited

U.S. PATENT DOCUMENTS

| 6,788,297 | B2 * | 9/2004 | Itoh et al. | 345/179 |
|---|---|---|---|---|
| 2002/0113779 | A1 * | 8/2002 | Itoh et al. | 345/173 |
| 2003/0226113 | A1 * | 12/2003 | Altman et al. | 715/520 |
| 2004/0189614 | A1 | 9/2004 | Nagatsuka et al. | |
| 2005/0207727 | A1 | 9/2005 | Hirose et al. | |
| 2005/0246621 | A1 | 11/2005 | Ogawa et al. | |

FOREIGN PATENT DOCUMENTS

| JP | A-1995-066898 | 3/1995 |
|---|---|---|
| JP | A-2002-014951 | 1/2002 |
| JP | A-2002-149511 | 5/2002 |
| JP | A-2002-203213 | 7/2002 |
| JP | A-2003-016394 | 1/2003 |
| JP | A-2004-139548 | 5/2004 |
| JP | A-2005-267147 | 9/2005 |
| JP | A-2005-316672 | 11/2005 |
| JP | A-2006-050388 | 2/2006 |

OTHER PUBLICATIONS

Office Action dated Jul. 27, 2012 issued in Japanese Patent Application No. 2007-323167 (with translation).

* cited by examiner

*Primary Examiner* — Moustafa M Meky
(74) *Attorney, Agent, or Firm* — Oliff & Berridge, PLC (57) ABSTRACT

A communication method controlling system includes a control apparatus and a writing apparatus. The writing apparatus includes a function that employs plural communication methods. When a user selects content by manipulating an operation terminal, a control apparatus detects the content ID, and transmits corresponding content data and communication method information to the writing apparatus. Based on the received content data, the writing apparatus writes the contents data and displays a content image on electronic paper, and changes a communication method according to the received communication method information and uses an LED lamp, for example, to notify the user which communication method has been selected. When the user performs an operation according to the available communication method, information is transmitted from the writing apparatus to a port using the communication method.

12 Claims, 5 Drawing Sheets

| CONTENT ID | COMMUNICATION METHOD INFORMATION |
|---|---|
| ⋮ | ⋮ |

*FIG. 3B*

| USER ID | COMMUNICATION METHOD INFORMATION |
|---|---|
| ⋮ | ⋮ |

*FIG. 3C*

| MEDIUM ID | COMMUNICATION METHOD INFORMATION |
|---|---|
| ⋮ | ⋮ |

*FIG. 3D*

| ADAPTER ID | COMMUNICATION METHOD INFORMATION |
|---|---|
| ⋮ | ⋮ |

*FIG. 3E*

| PORT ID | COMMUNICATION METHOD INFORMATION |
|---|---|
| ⋮ | ⋮ |

COMMUNICATION METHOD CONTROL SYSTEM

CROSS-REFERENCE TO RELATED APPLICATIONS

This application is based on and claims priority under 35 USC 119 from Japanese Patent Application No. 2007-323167 filed Dec. 14, 2007.

BACKGROUND

1. Technical Field

The present invention relates to a communication method control system, for controlling a communication method employed for communication with a writing apparatus which writes images on a display retaining medium, and to a writing apparatus and a control apparatus that together constitute the control system, and a computer readable medium for these apparatuses.

2. Related Art

A printed material is a material such as paper to which pigmented material including a developer such as an ink or a toner is supplied and on which a fixed image is displayed. As another medium replaceable the medium which displays and retains a fixed image, an display retaining medium has been developed which is configured to rewrite images according to an external writing force to form images on the medium, and which retains the images with displaying the images even after application of the external writing force is halted.

This display retaining medium includes a display portion as a portion displaying and retaining images and the display portion contains display material used for forming images. And when an external writing force, such as electricity, magnetism or heat or a chemical reaction produced by a liquid having a given PH, is applied to the display material, its state is physically or chemically changed. As a result, images are formed according to application of an external writing force. Subsequently, even when the application of this external writing force is halted, the images formed during its application are not lost and retain their shapes and illuminated state. But later, when a different external writing force is applied to the same display material, the images can be altered according to the different external writing force. Whenever an external writing force being applied to a display retaining medium is halted, the appearance (the data retaining state) of the display retaining medium, and the images displayed thereon, conveys to a viewer an impression of reading paper. And just like other electronic displays, the displayed information can be easily updated without externally supplying a coloring material or a developer. For this reason, the display retaining medium is commonly referred to as electronic paper.

SUMMARY

A communication method control system includes a writing apparatus and a control apparatus. The writing apparatus applies an external writing force to a display retaining medium so as to write an image on the display retaining medium on which (i) the image continues to be displayed after halting application of the external writing force and (ii) the image is changed or erased according to an application of another external writing force. The control apparatus controls communication methods employed by the writing apparatus. The writing apparatus is configured to communicate via any of the communication methods. The writing apparatus includes a transmission unit, a reception unit and a selector. The transmission unit transmits information to a different apparatus. The reception unit receives instruction information supplied by the control apparatus. And the selector selects one of the communication methods based on the received instruction information, available for the transmission unit transmitting the information. The control apparatus includes a storage unit, a detector and a controller. The storage unit, stores (i) identification information and (ii) communication method information indicating at least one of available communication methods, in association with each other. The detector detects the identification information relating to the writing apparatus transmitting the information. The controller controls to transmit, to the writing apparatus, based on the communication method information associated with the detected identification information, the instruction information relating to at least one of the communication methods available for the transmission unit transmitting the information.

BRIEF DESCRIPTION OF THE DRAWINGS

Exemplary embodiment(s) of the present invention will be described in detail based on the following figures, wherein.

DETAILED DESCRIPTION

First, a display retaining medium (so-called electronic paper) employed for the exemplary embodiment of the present invention will be described.

Electronic paper is an electronic medium (i) on which are displayed images, formed by an externally applied writing force, can later be changed by applying a different writing force, and (ii) on which such images continue to be displayed after the application of the external writing force has been halted. As the types of electronic paper available, for example, a display principle is the driving of an element by directly applying an external force such as electricity, magnetism or heat, for another type, a display principle is the driving of an element using irradiation with light to change a voltage, and for one other type, a display principle is driving an element in a chained manner, e.g., applying a voltage that changes the PH of a liquid, causing a coloration change.

As example electronic paper suitable for this exemplary embodiment, an electronic paper of an electronic writing type, which permits images to be changed electronically, and an electronic paper of an optical writing type, which permits images to be changed using irradiation of light, are employed.

Electronic paper of an electronic writing type is, for example, a thin, flexible A4 size medium. According to this paper, tiny color grains (e.g., white grains and black grains), used as toner for a copier, are enclosed between a pair of electrodes. And the pair of electrodes has transparent face at least on the obverse side. This is further sandwiched by a pair of film substrates having transparent face at least on the obverse side. An air layer is formed between the electrodes so that the color grains can move freely, and an insulation layer is provided between the matrix shaped electrode layers to prevent contact with the color grains. When a color filter is employed to this paper, a color display may be obtained with a simple structure.

In a state wherein no voltage is applied to the electrode of the electronic paper of an electronic writing type, the white grains, which have been negatively charged, are retained on the reverse side, while the black grains, which have been positively charged, are retained on the obverse side. When this electronic paper is viewed from the obverse side, the electronic paper appears to be solid black. Then, when the writing unit (driver) of the writing apparatus is operated, based on electronic data, and inverts electrode polarities at positions in a matrix corresponding to a content image to be displayed, the white grains and the black grains are replaced in some of the positions in the matrix, and the contents image is displayed using contrast between white and black grains. When operating the driver of the writing apparatus according to electronic data, the content image to be displayed using the contrast between white and black grains can be changed, and the electronic paper can be re-used many times by repeating this process.

Electronic paper of an optical writing type is, for example, a thin, flexible A4 size medium. To display an image on this paper, first, a content image is displayed on a writing device (a liquid crystal panel) of a writing apparatus. Then, a voltage is applied to the write electrode of the electronic paper by an external power source, and the electronic paper is superimposed on the liquid crystal panel and irradiated with light. The content image displayed on the liquid crystal panel can be transferred to and recorded on the electronic paper, and after the application of a voltage to the write electrode is halted, the content image can be held on the electronic paper.

The electronic paper of an optical writing type has a structure wherein, for example, an layer made of an organic optical conductive material used for a copier and a layer made of a liquid crystal display material (microencapsulated cholesteric material) are sandwiched a pair of transparent electrodes, and this laminated member is further sandwiched by the obverse and the reverse sides of a transparent base film. With this structure, a white display is provided by light reflected at the cholesteric material layer, and a black display is provided by passing light through the liquid crystal layer and absorbing the light at the black layer, which is formed between the cholesteric material layer and the organic light conductive layer. Therefore, a monochrome image display can be obtained. Furthermore, since the cholesteric material has a property that interferes with and reflects light colors in accordance with a spiral pitch, a cholesteric material layer may be formed by laminating liquid crystal at different spiral pitches, so that a color display can be obtained that has a simple structure.

Next, a communication method control system according to the invention will be specifically described based on the following exemplary embodiment.

Figure 1:
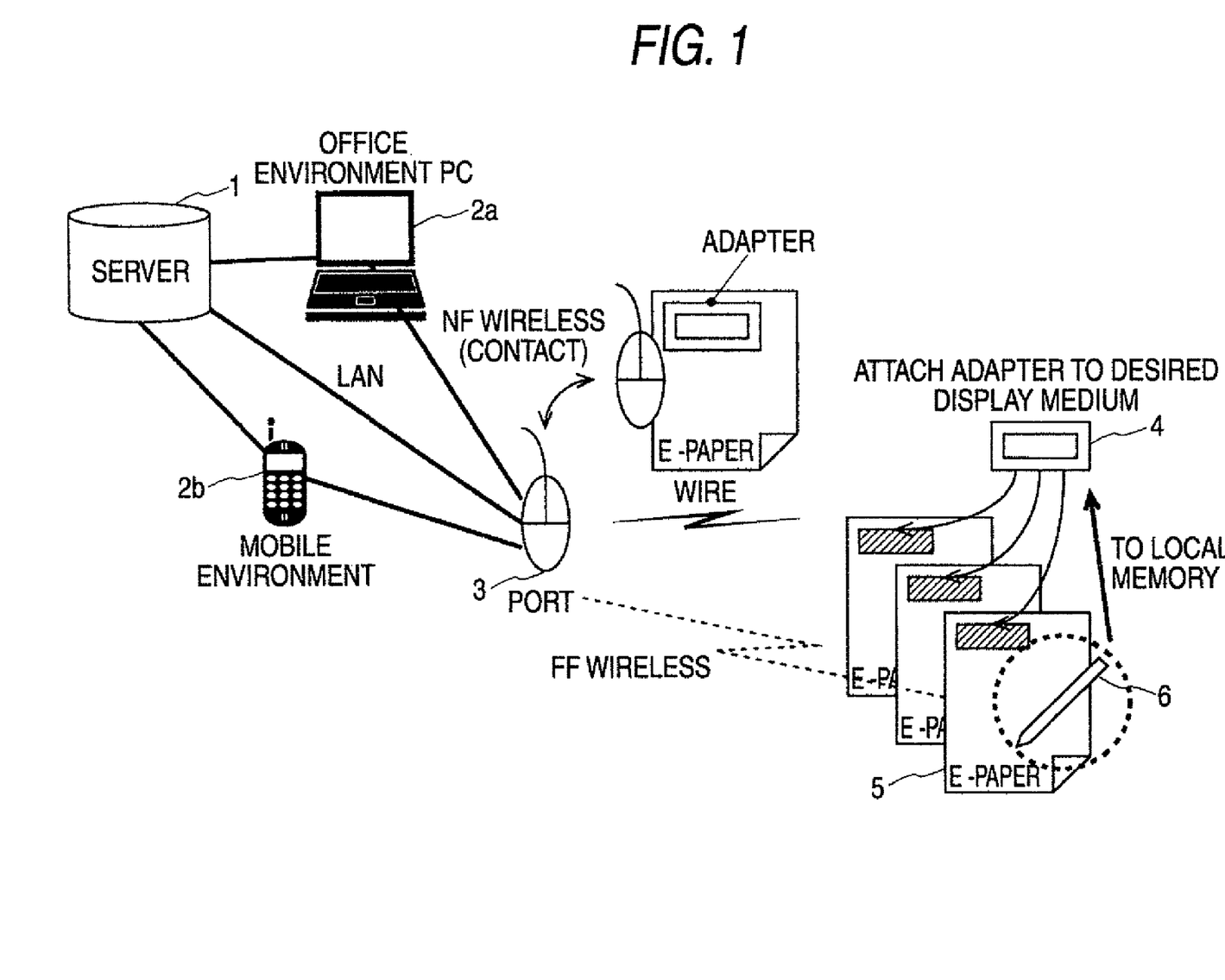
FIG. 1 is a diagram illustrating an overview of a communication method control system according to one exemplary embodiment of the present invention.

FIG. 1 is a diagram illustrating an overview of an example communication method control system according to one exemplary embodiment of the present invention.

The communication method control system of this exemplary embodiment includes: a server (a control apparatus) 1 that, for example, manages content data; operation terminals 2, such as a personal computer (PC) 2a and a mobile phone 2b; a port (a communication apparatus) 3 that is integrally formed with or is separated from the operation terminal 2 to perform communication with a writing apparatus 4; an adapter (a writing apparatus) 4 that writes and displays a content image on electronic paper 5; and a special input pen (a handwriting input device) 6 that is used to add handwriting to a content image displayed on the electronic paper 5.

The port 3 and the adapter 4 are compatible with a plurality of communication types, such as a wire communication method for performing communication via a connection cable, an NF (Near Field) wireless communication method for performing wireless communication in a contact state or at close range, and an FF (Far Field) wireless communication method for performing wireless communication at a long distance. And, as will be described later, a usable communication method can be selected in accordance with the environment.

Figure 2:
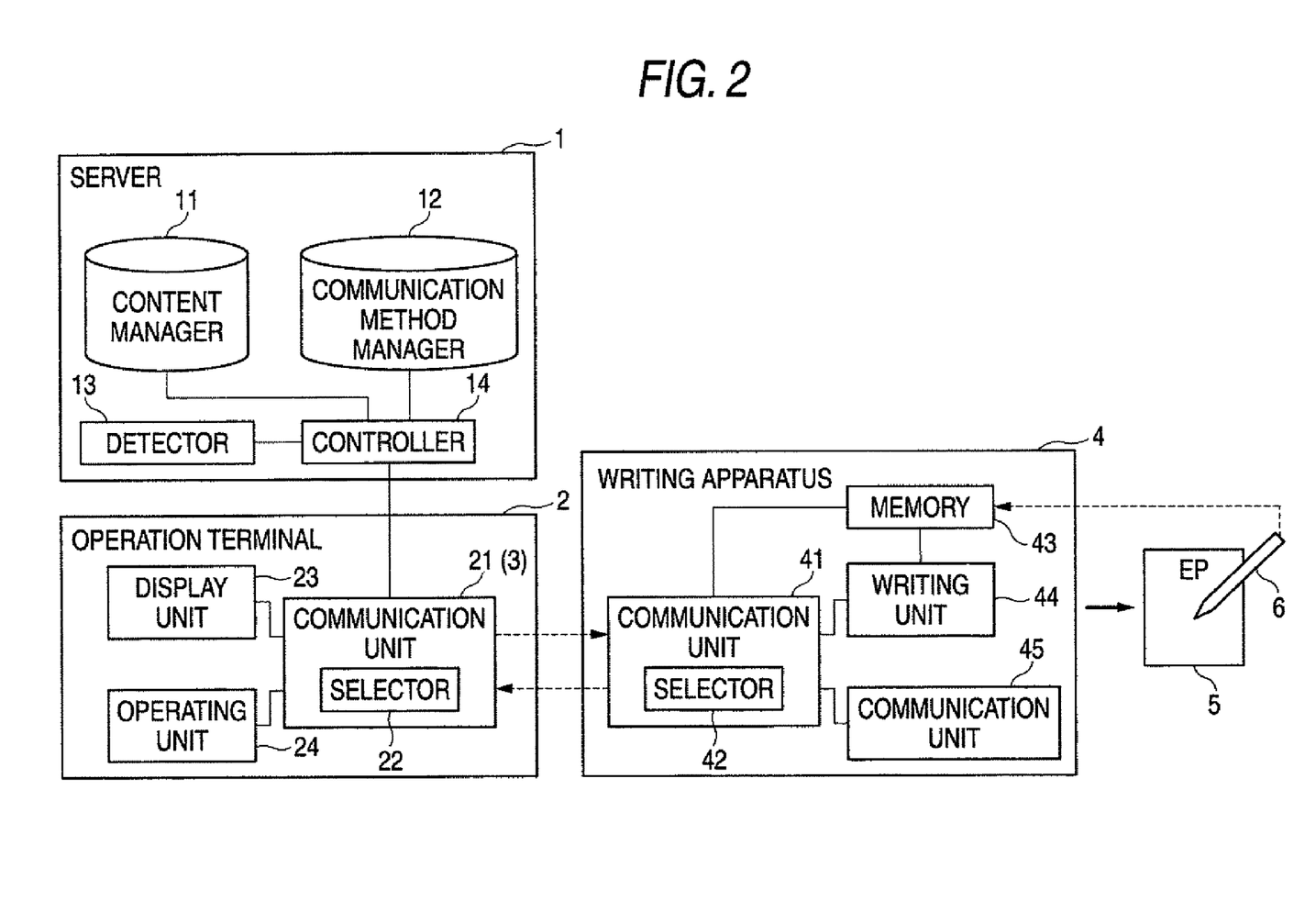
FIG. 2 is a functional block diagram illustrating the individual apparatuses included in the communication method control system according to the exemplary embodiment of the invention.

FIG. 2 is a functional block diagram illustrating the individual apparatuses that constitute the communication method control system of this exemplary embodiment.

The server 1 includes: a content manager 11 that stores and manages content data; a communication method manager 12 that stores and manages information related to the communication method applied between the port 3 and the adapter 4; a detector 13 that detects identification information (a content ID) for content that a user has designated for display on the electronic paper 5; and a controller 14 that controls the communication method applied between the port 3 and the adapter 4.

Figure 3A:
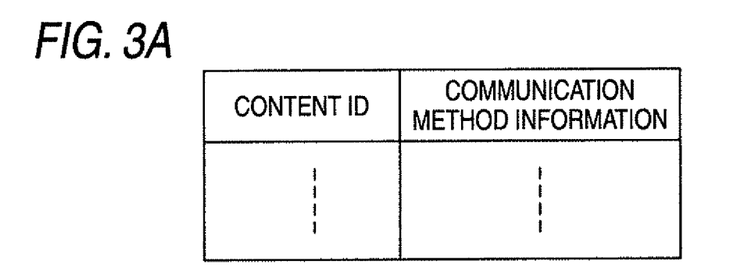
FIGS. 3A, 3B, 3C, 3D and 3E are diagrams showing data examples stored in a communication method manager according to the exemplary embodiment of the invention.

As shown in FIG. 3A, the communication method manager 12 stores content ID and communication method information, in association with each other.

The communication method information includes: one or more communication methods available for downstream communication, i.e., transmission of content data that corresponds to the content ID from the port 3 to the adapter 4, and one or more communication methods available for upstream communication, i.e., transmission from the adapter 4 to the port 3 of information, such as (i) log information related to the process during which the adapter 4 writes content images on the electronic paper 5 and (ii) information related to handwriting entered that is added to the content image displayed on the electronic paper 5.

The communication methods available for upstream communication and the communication methods available for downstream communication may be the same or may differ. Furthermore, in this exemplary embodiment, the available communication methods are contained in the communication method information; however, communication methods not-available for communications may be included. In short, it is enough for the communication method available for communication between the port 3 and the adapter 4 to be managed based on the communication method information.

The operation terminal 2 includes: a communication unit 21, which serves as the port 3 that performs communication with the adapter 4; a display unit 23, such as a liquid crystal display, that presents various data to a user; and an operating unit 24 such as buttons, that receives various instructions from a user. The communication unit 21 employs a plurality of communication methods, and includes a selector 22 that selects an available communication method in accordance with the communication method information.

To be described below, a mobile phone is employed as the operation terminal 2 and the port 3 to integrally configure them. However, the operation terminal 2 and the port 3 may be separately provided and connected by a cable. And instead of a mobile phone, a standalone apparatus, such as a desktop PC, or a portable apparatus, such as a PDA (Personal Digital Assistants), may be employed as the operation terminal 2.

The adapter 4 includes: a communication unit 41 that performs communication with the port 3; a writing unit 44 that employs received content data to write an image on the electronic paper 5; a notification unit 45 that notifies a user of available communication method(s); and a memory 43 that stores log information related to the content image writing process and handwriting information entered by the special input pen 6. The communication unit 41 employs a plurality of communication methods, and includes a selector 42 that selects an available communication method in accordance with the communication method information.

In this exemplary embodiment, electronic paper of an electronic rewriting type is employed as the electronic paper 5, and the writing unit 44 of the adapter 4 changes the polarity of a predetermined portion of a matrix electrode provided for the electronic paper 5 to write and display a content image on the electronic paper 5. When electronic paper of an optical writing type is employed, the writing unit 44 can be constituted by a function portion, such as an optical panel required for optical writing, thereby performs writing process according to the display method employed for the pertinent electronic paper, e.g., projects a content image onto the electronic paper 5. Furthermore, in this exemplary embodiment, the adapter 4 and the electronic paper 5 are connected but are detachable; however, these components may be integrally formed to provide electronic paper of self-rewriting type.

On the surface of the electronic paper 5 of this exemplary embodiment, different fine dot patterns are formed for individual coordinates, and the dot patterns are obtained by a small camera attached to the tip of the special input pen 6 so as to identify the location of the pen tip on the electronic paper 5. The trajectory of the pen tip that is thus obtained is wirelessly transmitted, as handwriting information, from the special input pen 6 to the adapter 4, and is stored in the memory 43 of the adapter 4.

The handwriting information may be obtained using another method. For example, a pressure sensitive panel that detects pressure applied by the pen tip may be provided on the surface of the electronic paper 5, and the trajectory of the pen tip detected by the pressure sensitive panel may be obtained as handwriting information.

Figure 4A:
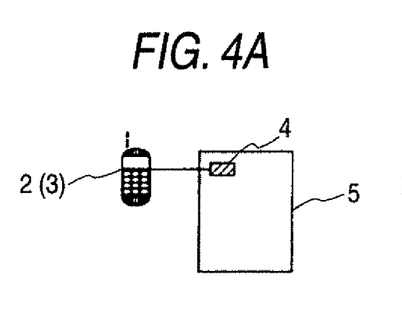
FIGS. 4A, 4B, 4C and 4D are diagrams for explaining communication methods according to the exemplary embodiment of the invention.
Figure 4B:
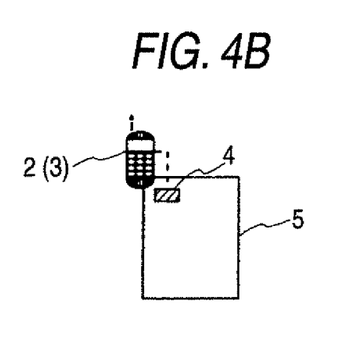
Figure 4C:
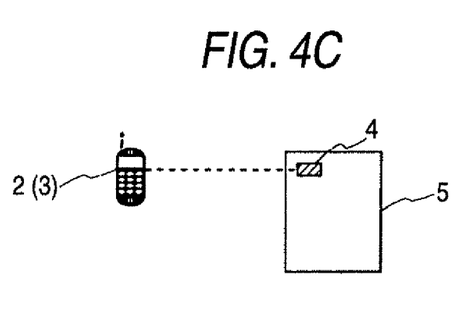
Figure 4D:
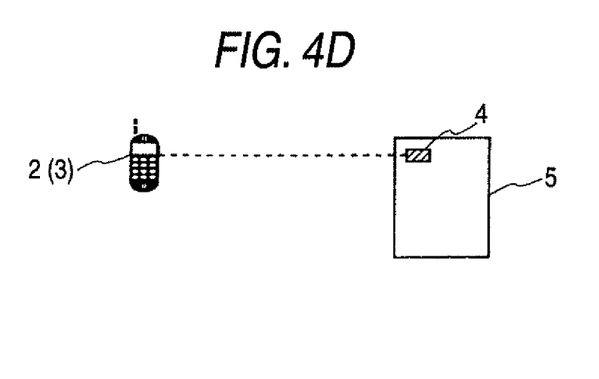

The communication method control system of this exemplary embodiment employs: a method shown in FIG. 4A, for using wire communication to connect the operation terminal 2 (port 3) to the adapter 4 either directly or indirectly by a cable; a method shown in FIG. 4B, for performing wireless communication in the contact state or at a close range (e.g., within 1 cm); a method shown in FIG. 4C, for performing wireless communication at an intermediate distance (e.g., within 30 cm); and a method shown in FIG. 4D, for performing wireless communication at a long distance (e.g., within 10 m).

Instead of the arrangement which has one wire communication method and three wireless communication methods, another arrangement may also be employed. For example, an arrangement that includes one wire communication method and one wireless communication method, or an arrangement that includes only a plurality of wireless communication methods employing different communication ranges (and does not include a wire communication method) is also available.

The communication unit 21 (port 3) of the operation terminal 2 and the communication unit 41 of the adapter 4 can communicate using each of these communication methods, and in accordance with an instruction issued by the controller 14 of the server 1, the selectors 22 and 42 change available communication methods in accordance with the communication method information.

In this exemplary embodiment, regardless of the content of the communication method information, the wire communication method having no danger of wireless interception (i.e., high security is provided) is always permitted to use, thereby ensures at least one available communication method. In addition, use of the wire communication method may be inhibited in accordance with the communication method information, and in this case, data exchange by employing a local memory method that uses an external portable storage medium may always be enabled.

Figure 5:
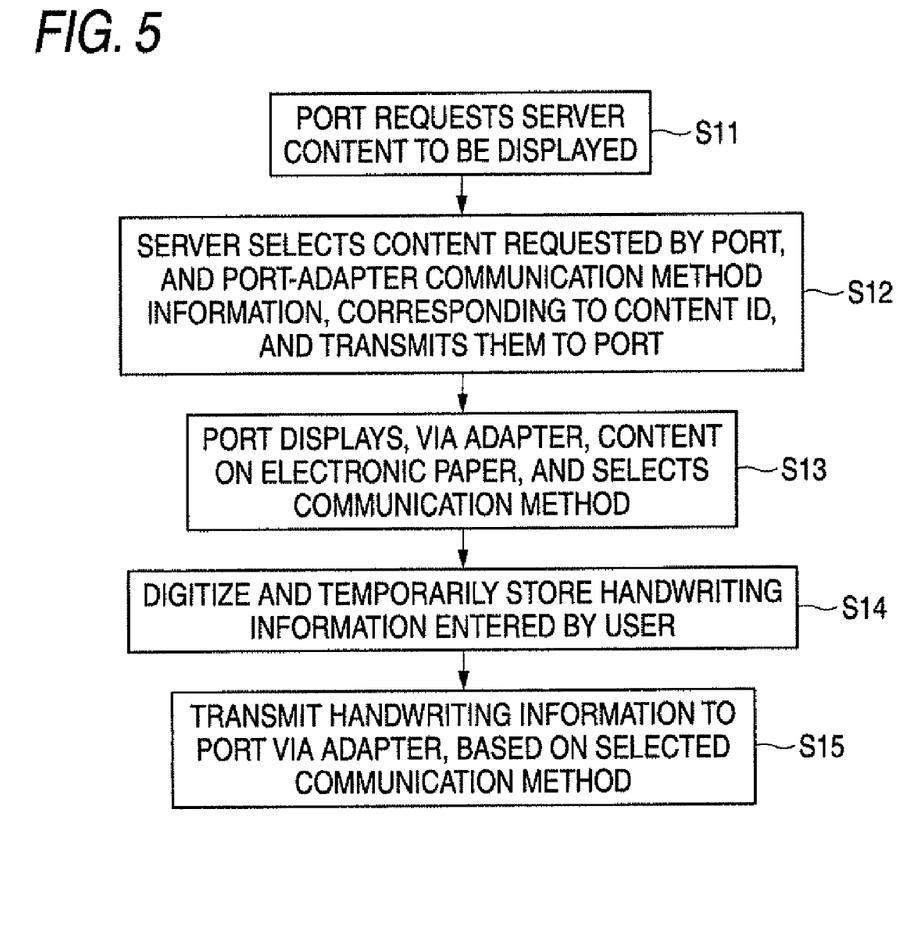
FIG. 5 is a flowchart for explaining the communication method control processing performed for the exemplary embodiment of the invention.

The communication method control processing performed by the communication method control system of this exemplary embodiment will now be described with reference to FIG. 5.

When a user has manipulated the operating unit 24 of the operation terminal 2 and selected content to be displayed, the operation terminal 2 transmits a content ID to the server 1 to request content data (step S11).

The server 1 employs the detector 13 to detect the requested content ID, examines the content manager 11 to obtain content data corresponding to the content ID, and examines the communication method manager 12 to obtain port-adapter communication method information corresponding to the content ID. Then, the server 1 transmits the content data and the communication method information to the port 3 (step S12).

When the port 3 (communication unit 21 of the operation terminal 2) receives the content data and the communication method information, the selector 22 employs the communication method information to select a communication method that can be used for downstream communication, for transmitting data from the port 3 to the adapter 4, and notifies a user of the selected communication method. In this exemplary embodiment, a method for displaying a notification on the display unit 23 is employed to notify the user of an available communication method. However, another notification method, such as an audio output method that uses loudspeakers, may be employed.

In accordance with the notified communication method (when a plurality of communication methods are presented, one communication method is selected by the user), the user performs an operation, e.g., (i) when a wire communication method is to be employed, the adapter 4 is connected to the port 3, or (ii) when a wireless communication method is to be employed, the adapter 4 is arranged at an appropriate position for its communication range. As a result, using the notified communication method, the content data and the communication method information are transmitted from the port 3 to the adapter 4. When this information may be transmitted immediately when an operation according to the communication method is performed, or under a condition that (1) the operation is performed and thereafter (2) a transmission button separately provided for the port 3 is depressed.

When the adapter 4 receives the content data and the communication method information, the writing unit 44 displays a content image on the electronic paper 5 based on the content data, and stores, in the memory 43, log information (e.g., a user ID, a content ID, a medium ID, a writing date and time, the process results indicating whether a process was successful) related to the writing process. Further, the selector 42 employs the communication method information to select a communication method that can be used for upstream communication to transmit data from the adapter 4 to the port 3, and notifies the user of the selected communication method (step S13). For the adapter 4 of this exemplary embodiment, LED lamps for identifying the individual communication methods are provided as the communication unit 44, and an LED lamp corresponding to an available communication method is turned on to notify the user. However, another notification method may be employed, such as an audio notification method using loudspeakers, or a method for displaying, on the electronic paper 5, an image indicating an available communication method that may be employed.

The user can employ the special input pen 6 and drawing to the content image displayed on the electronic paper 5. In accordance with the drawing entry, handwriting information identifying the drawing content is wirelessly transmitted from the special input pen 6 to the adapter 4, and is stored in the memory 43 of the adapter 4 (step S14).

When the user desires to transmit, to the port 3 or another apparatus, information (log information and handwriting information) stored in the memory 43 of the adapter 4, the user performs an operation according to the communication method that is presented by the notification unit 44 of the adapter 4 (when a plurality of communication methods are presented, one communication method is selected by the user), e.g., when a wire communication method is to be employed, the adapter 4 is connected to the port 3, or when a wireless communication method is to be employed, the adapter 4 is located at an appropriate position in its communication range. Then, using the notified communication method, the information is transmitted from the adapter 4 to the port 3 (step S15). This information may be transmitted immediately when an operation according to the communication method is performed, or under a condition that the operation is performed and thereafter a transmission button, separately provided for the port 3 or the adapter 4, is depressed.

As described above, according to this exemplary embodiment, since a communication method available for upstream communication and a communication method available for downstream communication are selected in accordance with the communication method information that is set up for the individual content, security control can be provided according to the actual data transmission environment.

Instead of associating the content with an available communication method as described above, a user, a usage date and time and a usage location may be associated with a communication method. Further, instead of providing the control using software, hardware control may be performed based, for example, on the electronic paper 5, the adapter 4 and the port 3 that are employed.

Figure 3B:
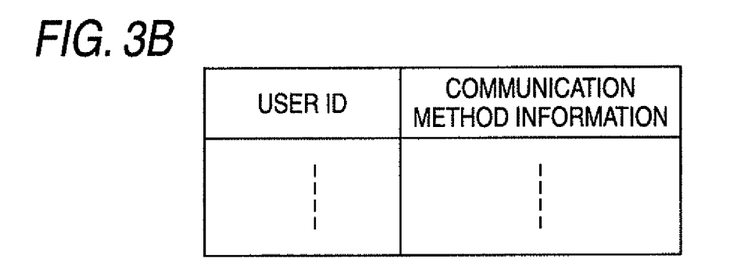

For providing communication control for each user, first, a user ID for identifying a user and communication method information are stored in the communication method manager 12 in association with each other, as shown in FIG. 3B. Then, the user ID is detected by the detector 13, and based on the communication method information associated with the user ID, communication control can be provided.

Various methods can be employed for detecting a user ID; for example, a user ID entered by a user may be accepted and detected or a user ID may be specified and detected using bio-authentication based on inherent biological characteristics of the user, such as a fingerprint; or a user ID preregistered on the electronic paper 5, or at the adapter 4, the port 3 or the operation terminal 2 may be read and detected.

For providing communication control based on usage date and time, a usage date and time and communication method information are stored in the communication method manager 12, in association with each other. And the usage date and time may be detected by the detector 13, and based on communication method information associated with the usage date and time, communication control can be provided.

For providing communication control based on a usage location, a location ID for identifying a usage location and communication method information are stored in the communication method manager 12 in association with each other. Then, the location ID is detected by the detector 13, and based on communication method information associated with the location ID, communication control can be provided.

Various methods can be employed to detect a location ID; for example, an apparatus that transmits a location ID is arranged in each usage location, and the operation terminal 2, the port 3 and the adapter 4 receive and detect the location ID; the GPS (Global Positioning System) may be employed to detect a location ID; and a location ID entered by a user may be received and detected.

Figure 3C:
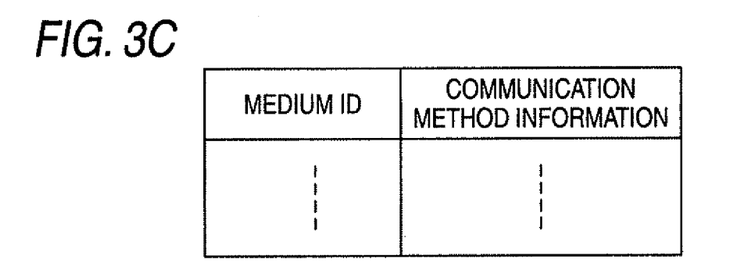

For providing communication control based on the electronic paper 5, a medium ID for identifying the electronic paper 5 and communication method information are stored in the communication method manager 12, in association with each other, as shown in FIG. 3C. The medium ID is detected by the detector 13, and based on communication method information associated with the medium ID, communication control can be provided.

Various methods can be employed for the detection of a medium ID; for example, a medium ID recorded in advance on the electronic paper 5 may be scanned and detected by the adapter 4; or a medium ID entered by a user may be accepted and detected.

Figure 3D:
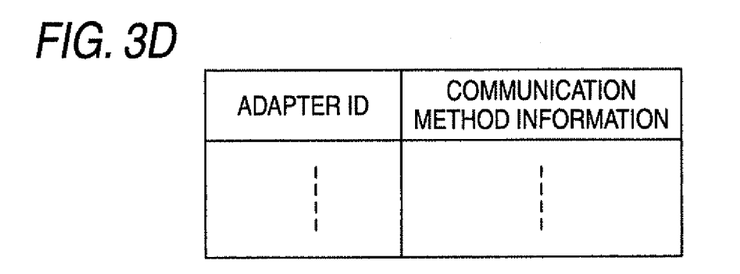

For providing communication control based on the adapter 4, an adapter ID for identifying the adapter 4 and communication method information are stored in the communication method manager 12, in association with each other, as shown in FIG. 3D. Then, the adapter ID is detected by the detector 13, and based on communication method information associated with the adapter ID, communication control can be provided.

Various methods can be employed for the detection of an adapter ID; an adapter ID stored in advance in the adapter 4 may be read and detected; or an adapter ID entered by a user may be accepted and detected.

Figure 3E:
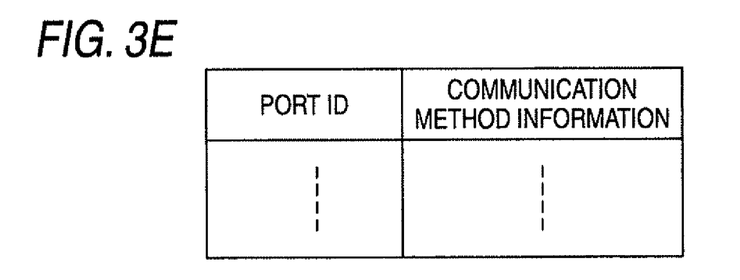

For providing communication control based on the port 3, a port ID for identifying the port 3 and communication method information are stored in the communication method manager 12, in association with each other, in FIG. 3E. Then, the port ID is detected by the detector 13, and based on communication method information associated with the port ID, communication control can be provided.

Various methods can be employed for detection of a port ID; for example, a port ID stored in advance in the port 3 may be read and detected; or a port ID entered by a user may be accepted and detected.

Two or more types of communication method information, such as communication method information for individual content, for each user, for each electronic paper, for each adapter and for each port, may be stored in the communication method manager 12, and an available communication method may be selected to perform an overall determination assessment of the actual data transmission environment.

For example, (i) communication method information for individual content and (ii) communication method information for each electronic paper are stored in the communication method manager 12, and only a communication method which is available (i) for content to be displayed and (ii) for electronic paper on which the content is to be displayed is employed.

Figure 6:
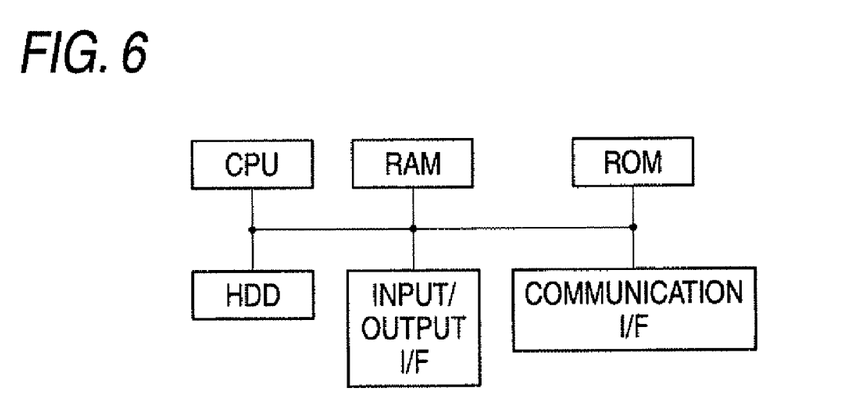
FIG. 6 is a diagram illustrating the hardware configuration of a server according to the exemplary embodiment of the invention.

FIG. 6 is a diagram illustrating the hardware configuration for the server 1 according to this exemplary embodiment.

Specifically, the server 1 of this exemplary embodiment is a computer that includes hardware resources such as: a CPU that performs various computations; a RAM used as a working memory for the CPU; a ROM used to store a basic control program; an HDD used to store a program that provides functions that are related to the invention; an input/output I/F that is an interface with devices such as a liquid crystal display device, that displays information for a user, and a mouse and a keyboard, that accepts the entry of information by a user; and a communication I/F that is an interface that performs communication with another apparatus.

When the program according to the invention is read from the HDD and developed on the RAM, and is executed by the CPU, the functions of the control apparatus are provided for the computer of the server 1.

As well as the server 1, the adapter 4 of this exemplary embodiment is a computer that includes hardware resources such as a CPU, a RAM and an HDD. When the program according to the present invention is read from the HDD and developed on the RAM, and is executed by the CPU, the functions of the writing apparatus are provided for the computer of the adapter 4.

The program according to the invention is obtained by reading an external storage medium, such as a CD-ROM, on which the program is stored, or by being downloaded via a network, so that a person can carry out the intent of the present invention. Furthermore, the individual functions of the control apparatus and the writing apparatus of this invention are not necessarily obtained through the software arrangement of this exemplary embodiment, and may be provided by special hardware modules. Further, the functions of the control apparatus and the writing apparatus of the invention need not always be arranged in a single computer, as in this exemplary embodiment, and may be distributed to a plurality of computers. In addition, these functions of the control apparatus of the invention may be constituted as the operation terminal 2 or the port 3.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication method control system comprising:
    a writing apparatus that applies an external writing force to a display retaining medium so as to write an image on the display retaining medium on which (i) the image continues to be displayed after halting application of the external writing force and (ii) the image is changed or erased according to an application of another external writing force; and
    a control apparatus that controls communication methods employed by the writing apparatus,
    wherein the writing apparatus is configured to communicate via any of the communication methods,
    the writing apparatus includes:
        a transmission unit that transmits information to a different apparatus;
        a reception unit that receives instruction information supplied by the control apparatus; and
        a selector that selects one of the communication methods based on the received instruction information, available for the transmission unit transmitting the information,
    wherein the control apparatus includes
        a storage unit, that stores (i) identification information and (ii) communication method information indicating at least one of available communication methods, in association with each other,
        a detector that detects the identification information relating to the writing apparatus transmitting the information, and
        a controller that controls to transmit, to the writing apparatus, based on the communication method information associated with the detected identification information, the instruction information relating to at least one of the communication methods available for the transmission unit transmitting the information.

2. The communication method control system according to claim 1,
    wherein at least one the writing apparatus and the control apparatus includes:
    a communication unit that notifies a user of at least one of the communication methods available for the transmission unit transmitting the instruction information.

3. The communication method control system according to claim 1,
    wherein the transmission unit of the writing apparatus is allowed to employ a wire communication method even when the instruction information received from the control apparatus indicates a communication method except for the wire communication method.

4. The communication method control system according to claims 1,
    wherein the identification information indicates identification information provided for the display retaining medium.

5. The communication method control system according to claim 1,
    wherein the identification information indicates identification information provided for the writing apparatus.

6. The communication method control system according to claim 1,
    wherein the predetermined identification information is identification information provided for the different apparatus that receives the information from the writing apparatus.

7. The communication method control system according to claim 1,
    wherein the identification information indicates identification information of an image written on the display retaining medium.

8. The communication method control system according to claim 1,
  wherein the identification information indicates identification information of a user.

9. A writing apparatus comprising:
  a writing unit that applies an external writing force so as to write images on a display retaining medium on which (i) the image continue to be displayed after halting application of the external writing force and (ii) the image is changed or erased according to an application of another external writing force;
  a transmission unit that employs any of communication methods, and that transmit information to a different apparatus;
  a reception unit that receives instruction information, the instruction information (i) which corresponds to identification information relating to transmitting the information to the different apparatus, (ii) which is transmitted from a control apparatus which detects the identification information and (iii) which relates to at least one of the communication methods available for the transmission unit transmitting the information; and
  a selector employs the received instruction information to select a communication method available for the transmission unit transmitting the information.

10. A control apparatus comprising:
  a storage unit that stores (i) identification information and (ii) communication method information indicating at least one of available communication methods, in association with each other,
  a detector that detects the identification information relating to a writing apparatus transmitting information to a different apparatus, the writing apparatus which applies an external writing force so as to write an image on a display retaining medium on which (i) the image continue to be displayed after halting application of the external writing force and (ii) the image is changed or erased according to an application of another external writing force; and
  a controller that controls to transmit, to the writing apparatus, based on the communication method information associated with the detected identification information, the instruction information relating to at least one of the communication methods available for the transmission unit transmitting the information, such that permitting the writing apparatus to select a communication method which is (i) available for the transmission unit transmit the information and (ii) one of the communication methods stored in the writing apparatus.

11. A computer readable medium storing a program causing a computer to execute a process for managing communication methods, the process comprising:
  applying an external writing force so as to write images on a display retaining medium on which (i) the image continue to be displayed after halting application of the external writing force and (ii) the image is changed or erased according to an application of another external writing force;
  employing any of communication methods, and that transmit information to a different apparatus;
  receiving instruction information, the instruction information (i) which corresponds to identification information relating to transmitting the information to the different apparatus, (ii) which is transmitted from a control apparatus which detects the identification information and (iii) which relates to at least one of the communication methods available for transmitting the information; and
  employing the received instruction information to select a communication method suitable to use for transmitting the information.

12. A computer readable medium storing a program causing a computer to execute a process for managing communication methods, the process comprising:
  storing (i) identification information and (ii) communication method information indicating at least one of available communication methods, in association with each other;
  detecting the identification information relating to a writing apparatus transmitting information to a different apparatus, the writing apparatus which applies an external writing force so as to write an image on a display retaining medium on which (i) the image continue to be displayed after halting application of the external writing force and (ii) the image is changed or erased according to an application of another external writing force; and
  controlling to transmit, to the writing apparatus, based on the communication method information associated with the detected identification information, the instruction information relating to at least one of the communication methods available for transmitting the information, such that permitting the writing apparatus to select a communication method which is (i) available for transmitting the information and (ii) one of the communication methods stored in the writing apparatus.

* * * * *